United States Patent
Wu et al.

(10) Patent No.: US 9,541,146 B1
(45) Date of Patent: Jan. 10, 2017

(54) BRAKING DEVICE FOR MOTOR OF ACTUATOR

(71) Applicant: TIMOTION TECHNOLOGY CO., LTD., New Taipei (TW)

(72) Inventors: Chou-Hsin Wu, New Taipei (TW); Vladimir Jurka, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/806,948

(22) Filed: Jul. 23, 2015

(30) Foreign Application Priority Data

Jun. 22, 2015 (TW) .............................. 104120025 A

(51) Int. Cl.
  *F16D 65/22* (2006.01)
  *F16D 125/58* (2012.01)
  *F16D 121/14* (2012.01)

(52) U.S. Cl.
  CPC ........... *F16D 65/22* (2013.01); *F16D 2121/14* (2013.01); *F16D 2125/582* (2013.01)

(58) Field of Classification Search
  CPC ...... H02K 7/102; H02K 7/1166; H02K 7/116; H02K 7/14; F16H 25/2454; F16H 2025/209; F16D 49/02; F16D 65/22; F16D 2121/14; F16D 2125/582; F16D 49/04; F16D 65/06; F16D 65/065; F16D 2121/26; F16D 2127/06
  USPC ...... 188/166, 156, 162, 171, 67; 310/76, 77, 310/92, 93, 120, 123; 74/89.37, 89.38, 89.39
  See application file for complete search history.

(56) References Cited

U.S. PATENT DOCUMENTS

| | | | |
|---|---|---|---|
| 7,137,489 B2 * | 11/2006 | Bastholm | F16H 25/2454 188/156 |
| 7,594,450 B2 * | 9/2009 | Wu | H02K 7/06 5/616 |
| 8,091,444 B2 * | 1/2012 | Tseng | F16H 25/2454 188/180 |

(Continued)

FOREIGN PATENT DOCUMENTS

| CN | 103620255 A | 3/2014 |
|---|---|---|
| EP | 0662573 B1 | 4/1998 |

(Continued)

OTHER PUBLICATIONS

Office Action dated Oct. 21, 2016 of the corresponding Taiwan patent application.

*Primary Examiner* — Thomas J Williams
*Assistant Examiner* — Mariano Sy
(74) *Attorney, Agent, or Firm* — Chun-Ming Shih; HDLS IPR Services

(57) ABSTRACT

A braking device is used in a motor of an actuator having a shaft. The braking device includes a base, an elastic unit, a braking mechanism and a stopper. The base includes an axial connected section and a placed section. The elastic unit is disposed at the placed section. The braking mechanism is assembled at the axial connected section. The braking mechanism includes a braking ring sleeved on the shaft and a coil spring tightened to the outer peripheral edge of the braking ring. A first torque arm and a second torque arm extend from the two ends of the coil spring. The first torque arm abuts one end of the elastic unit. The stopper corresponds to the rotational path of the second torque arm and is disposed at the base. Thereby, the assembly is easier and the braking ring has a more stable effect of braking.

17 Claims, 7 Drawing Sheets

(56) References Cited

U.S. PATENT DOCUMENTS

| | | | |
|---|---|---|---|
| 8,210,064 B2* | 7/2012 | Ku | B66F 3/08 |
| | | | 74/89.38 |
| 8,528,706 B2* | 9/2013 | Wu | H02K 7/1166 |
| | | | 188/67 |
| 9,303,740 B2* | 4/2016 | Wu | F16H 25/20 |
| 9,369,026 B2* | 6/2016 | Wu | H02K 7/102 |
| 2006/0081079 A1* | 4/2006 | Jaecklin | F16H 25/2454 |
| | | | 74/89.23 |
| 2007/0068765 A1 | 3/2007 | Koga | |
| 2010/0139429 A1* | 6/2010 | Ku | B66F 3/08 |
| | | | 74/89.37 |
| 2013/0169088 A1* | 7/2013 | Wu | H02K 7/102 |
| | | | 310/77 |

FOREIGN PATENT DOCUMENTS

| | | |
|---|---|---|
| TW | 201328137 A | 7/2013 |
| WO | 9702439 A1 | 1/1997 |
| WO | 2004027290 A2 | 4/2004 |

\* cited by examiner

BRAKING DEVICE FOR MOTOR OF ACTUATOR

TECHNICAL FIELD

The disclosure relates to a braking device, more particularly to a braking device for a motor of an actuator.

BACKGROUND

Linear actuators mainly use electric motors and actuating elements, such as worm gears and worm wheels, to actuate leadscrews rotating. Meanwhile, the leadscrews actuate telescopic tubes screwed thereof extending out or retracting. Since the structure and the assembly are simpler and more convenient than pneumatic cylinders or hydraulic cylinders, the linear actuators are widely used in apparatuses, such as sickbeds, electric chairs and other fields that need expansion and retraction.

Conventional linear actuators are disclosed in EP0662573B and WO2004-027290A2, wherein EP0662573B discloses that an actuator mainly comprises a worm gear, a leadscrew, and a worm wheel assembly fixed at one end of the leadscrew. The worm wheel assembly comprises a worm wheel, a coil spring surrounding the outer peripheral edge of a cylindrical annular body. WO2004-027290A2 seeks to solve the problem in the previous application that a great amount of heat is generated by the friction between the coil spring and the annular body during the movement, and it applies a heat conducting unit to dissipate heat.

However, the coil spring in conventional linear actuator is fixed, and the cylindrical annular body rotates with the worm wheel, so that heat is generated by the friction between the coil spring and the cylindrical annular body. In addition, the cylindrical annular body is generally made of plastics, so that the heat would cause the cylindrical annular body melting or the coil spring being worn out rapidly. Thus, the lifespan is greatly decreased. Also, the braking effect is achieved merely by linear contact between the coil spring and the cylindrical annular body, which is rotating, for decelerating or braking. Since the effective contact areas between the coil spring and the annular body is small, the ability of decelerating or braking is limited.

SUMMARY

One purpose of the disclosure is to provide a braking device for a motor of an actuator. The braking device retracts the coil spring by the elastic force of the elastic unit, so that the braking ring can have a stable braking effect.

To reach this goal, the disclosure provides a braking device for a motor of an actuator. The motor of an actuator comprises a shaft. The braking device comprises a base, an elastic unit, a braking mechanism and a stopper. The base includes an axial connected section and a placed section formed at a lateral side of the axial connected section; the elastic unit is disposed at the placed section; the braking mechanism is assembled at the axial connected section, the braking mechanism comprises a braking ring sleeved on the shaft and a coil spring tightened to the outer peripheral edge of the braking ring, a first torque arm and a second torque arm extend from the two ends of the coil spring, and the first torque arm abuts one end of the elastic unit; the topper corresponds to the rotational path of the second torque arm and is disposed at the base.

Moreover, the disclosure may also achieve the following effects. The disclosure assembles the elastic unit, the braking mechanism and the stopper inside the body in advance, so that the assembly process and assembly time of the braking device and the motor of the actuator can be greatly reduced. The braking device can be used in motors of actuators with different braking forces by the use of the adjusting lever. When the braking device of the disclosure is used for the linear actuator, the linear actuator can decline in a steady velocity, so that the user can have comfortable experience. The braking device of the disclosure further has advantages of a simple structure, low costs and a small size.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Figure 1:
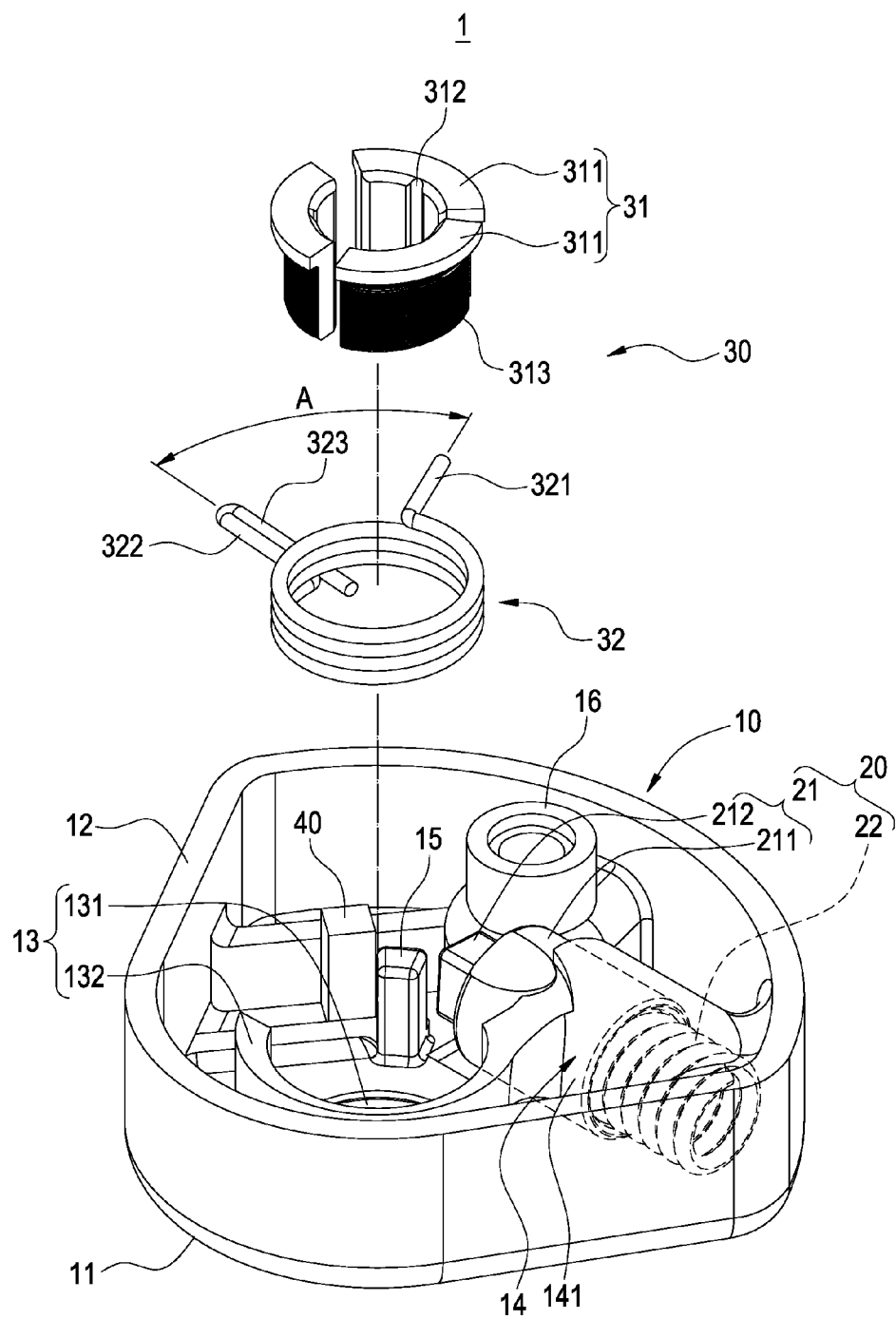
FIG. 1 is an exploded perspective view of a braking device according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
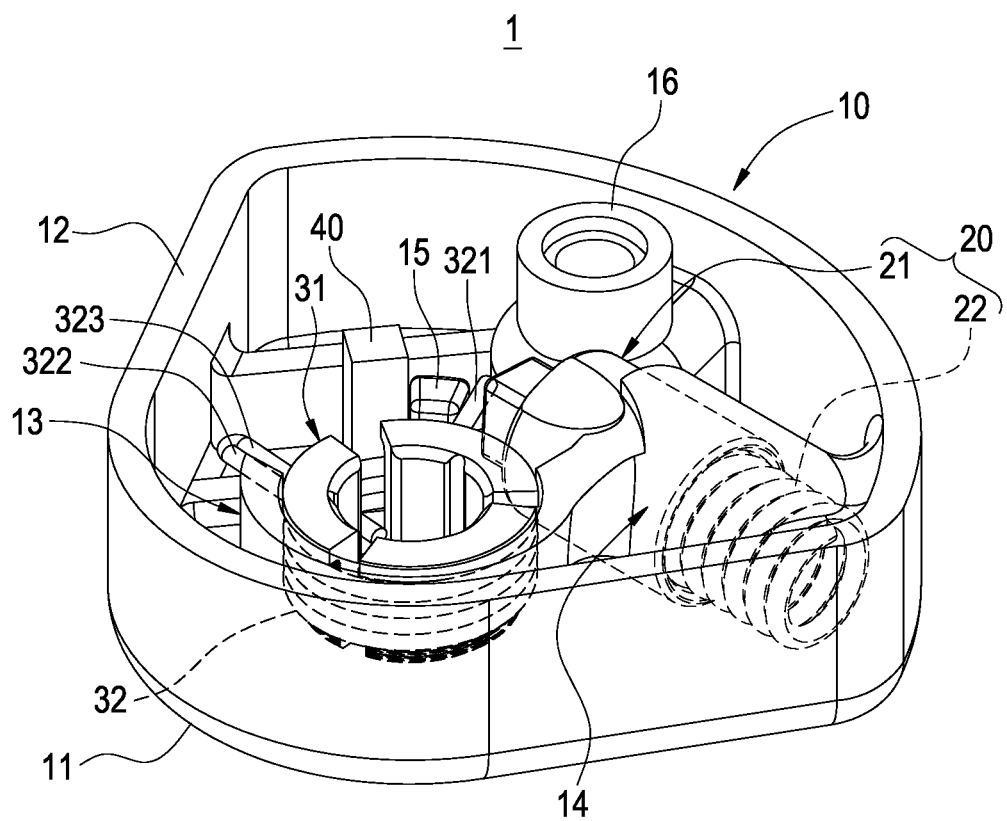
FIG. 2 is a combinational view of the braking device according to the disclosure.

Referring to FIGS. 1 and 2, the disclosure provides a braking device used for a motor of an actuator. The braking device 1 mainly comprises a base 10, an elastic unit 20, a braking mechanism 30 and a stopper 40.

The base 10 can be made of plastics, and it mainly comprises a circular sector shaped bottom plate 11 and a hoarding 12 extending upward from the peripheral edge of the bottom plate 11. The middle section of the bottom plate 11 has an axial connected section 13. The axial connected section 13 is a hole 131 set up at the bottom plate 11 and a curve wall 132 extending from the peripheral edge of the hole 131. Also, a placed section 14 is formed at a lateral side of the axial connected section 13, and the placed section 14 is a semi-cylindrical barrel 141 formed between the bottom plate 11 and the hoarding 12. Further, a vertical column 15 extends from the bottom plate 11 and the vertical column 15 is disposed at the front end of the semi-cylindrical barrel 141 and corresponds to a notch of a curve wall 132. In addition, a fixed column 16 is disposed at the side of the semi-cylindrical barrel 141 and the vertical column 15, such that screwed units, such as bolts, can pass through and fix with it.

In this embodiment, the elastic unit 20 is a compressive elastic unit, and it mainly comprises a gliding unit 21 and a compressive spring 22. The gliding unit 21 comprises a cylinder 211 and a protrusion 212 extending from the cylinder 211. The cylinder 211 is movably disposed inside the semi-cylindrical barrel 141. The compressive spring 22 is disposed inside the semi-cylindrical barrel 141 and is elastically clamped between the hoarding 12 and the cylinder 211.

The braking mechanism 30 is assembled at the axial connected section 13 of the base 10, and it mainly comprises a braking ring 31 and a coil spring 32 tightened to the outer peripheral edge of the braking ring 31. The braking ring 31 can be made of metals or plastics. In this embodiment, the braking ring 31 comprises three curve plates 311. The inner wall of each of the curve plates 311 has an oil storage tank 312 disposing therein, and each of the oil storage tanks 312 corresponds to the axial direction of the curve plates 311. Also, each of the outer walls of the curve plates 311 has a plurality of grooves 313, and each of the plurality of grooves 313 is disposed corresponding to the radial direction of the plurality of curve plates 311. Thus, the coil spring 32 can be fixed with each of the curve plates 311 stably.

A first torque arm 321 and a second torque arm 322 extend from the two ends of the coil spring 32. The first torque arm 321 is disposed between the protrusion 212 of the gliding unit 21 and the vertical column 15, and the first torque arm 321 is abutted by the protrusion 212. Under the free status, the angle A between the first torque arm 321 and the second torque arm 322 is between 10° and 50°. Preferably, the angle A is between 20° and 40°. Most preferably, the angle A is 30°. When the angle A is greater than 50° or when the angle A is smaller than 10°, the breaking force is too large or too small so that it cannot be applied.

Moreover, a stop lever 323 folds inwardly from the free end of the second torque arm 322. The stop lever 323 passes into the intervals formed between any two adjacent curve plates 311, so as to prevent the curve plates 311 swinging excessively.

In this embodiment, the stopper 40 is a fixed stopper 40, and it corresponds to the rotational path of the second torque arm 322 and is fixed to the bottom plate 11 of the base 10.

Figure 3:
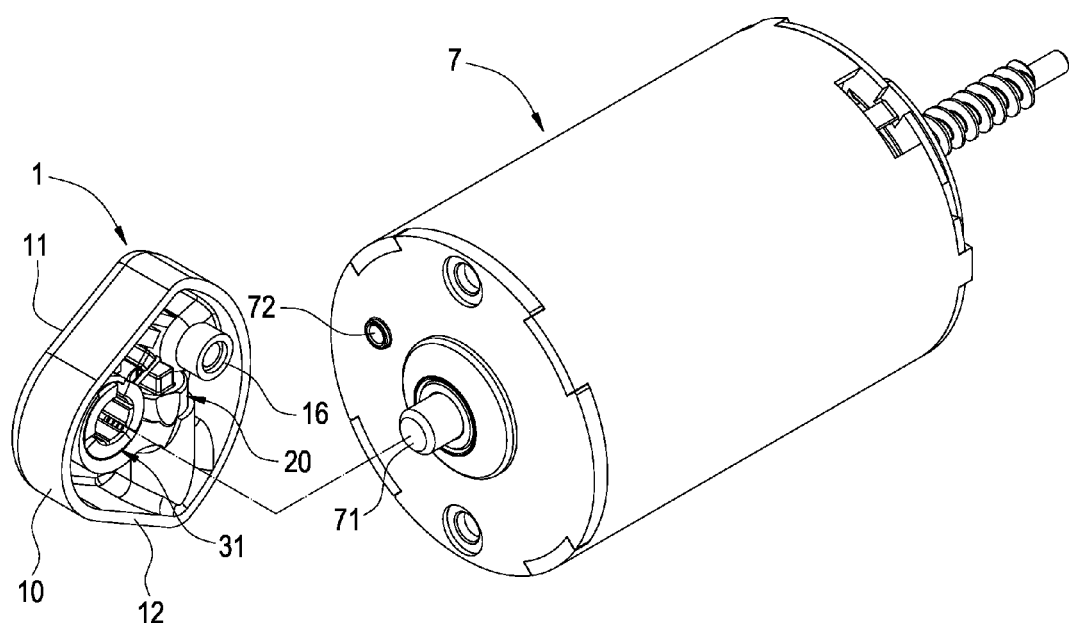
FIG. 3 is an exploded view of the braking device used for a motor of an actuator of the disclosure.
Figure 4:
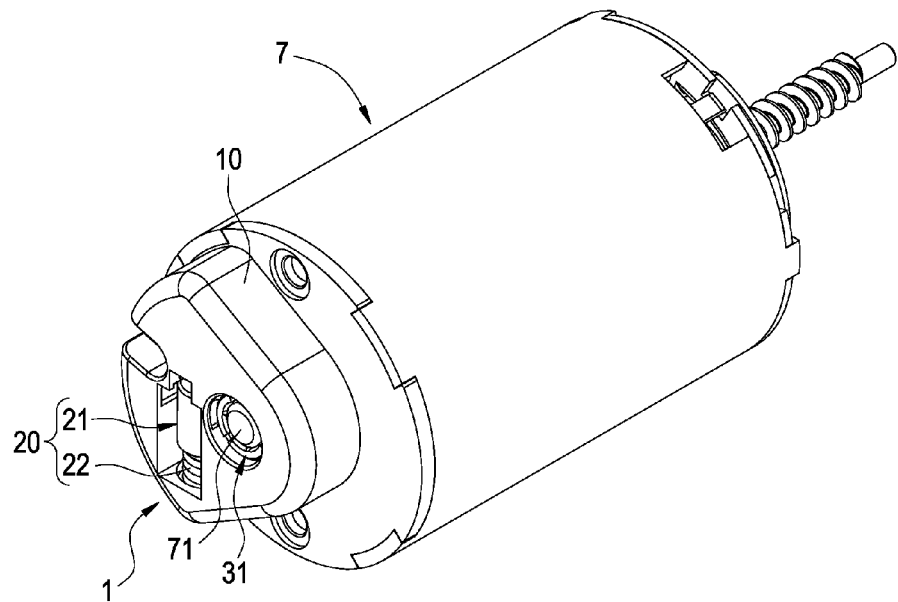
FIG. 4 is a combinational view of the braking device used for a motor of an actuator of the disclosure.
Figure 5:
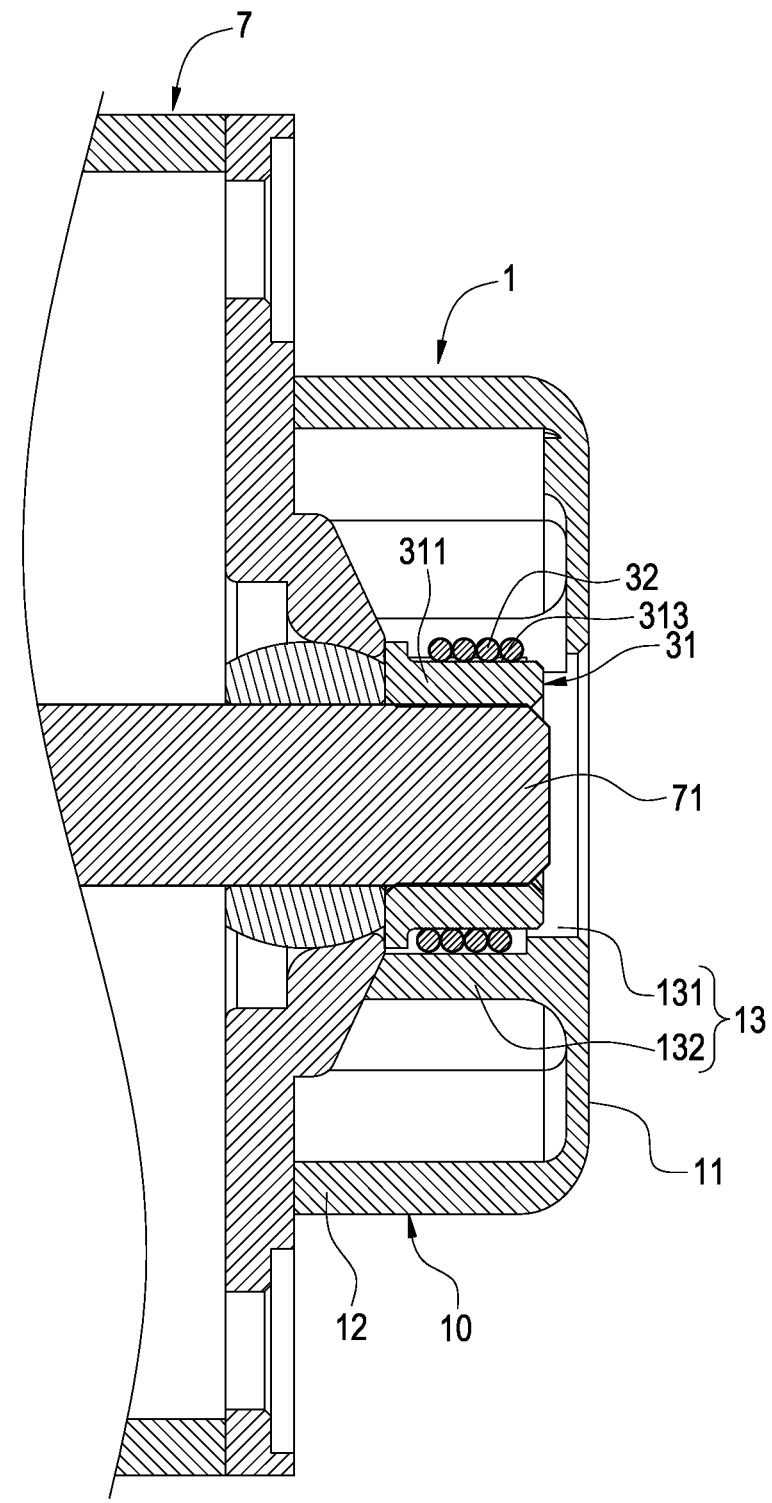
FIG. 5 is a combinational sectional view of the braking device used for a motor of an actuator of the disclosure.

Referring to FIGS. 3-5, the braking device 1 of the disclosure can be used for a motor 7 of an actuator. The motor 7 of the actuator comprises a shaft 71 and has a screw hole 72. For assembling, the braking ring 31 of the braking mechanism 30 is sleeved corresponding to the shaft 71, the end surface of the hoarding 12 attaches the back end surface of the motor 7 of the actuator, and a bolt passes through the fixed column 16 so as to be fixed to the screw hole 72. Thus, the assembling process of the braking device 1 and the motor 7 of the actuator of the disclosure can be easily accomplished.

Figure 6:
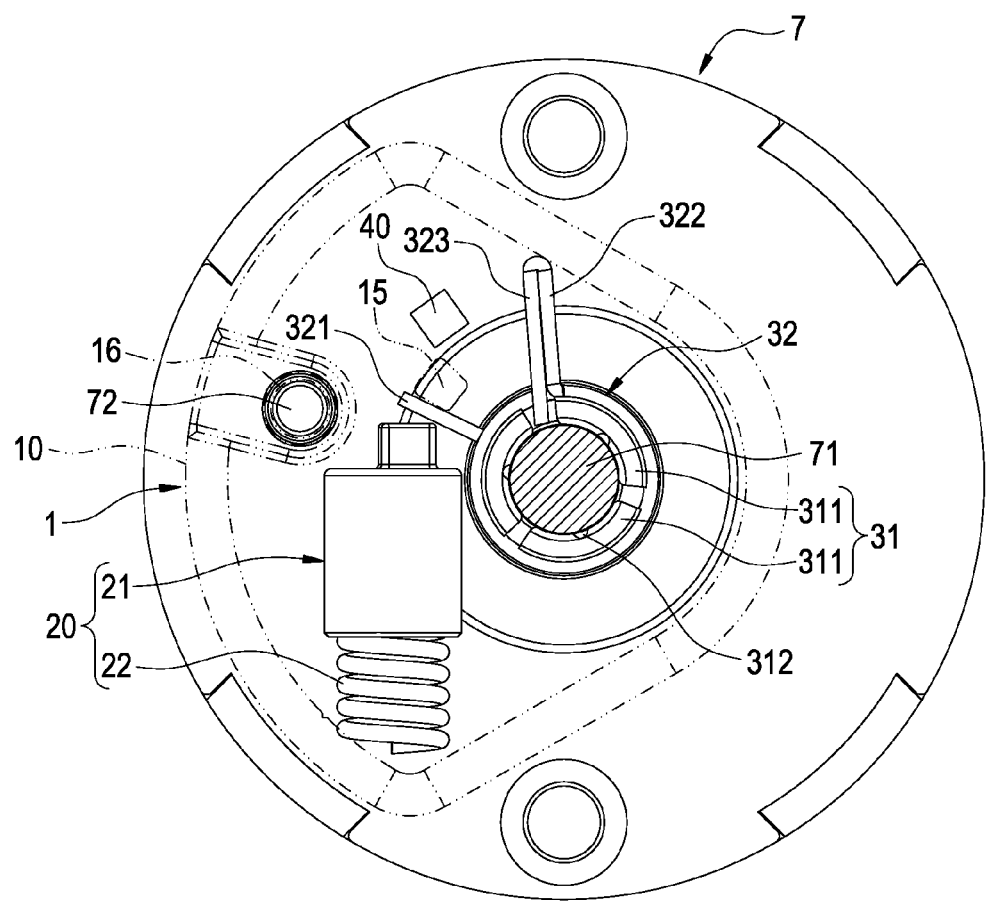
FIG. 6 is a schematic view of a first using status of the braking device used for a motor of an actuator of the disclosure.
Figure 7:
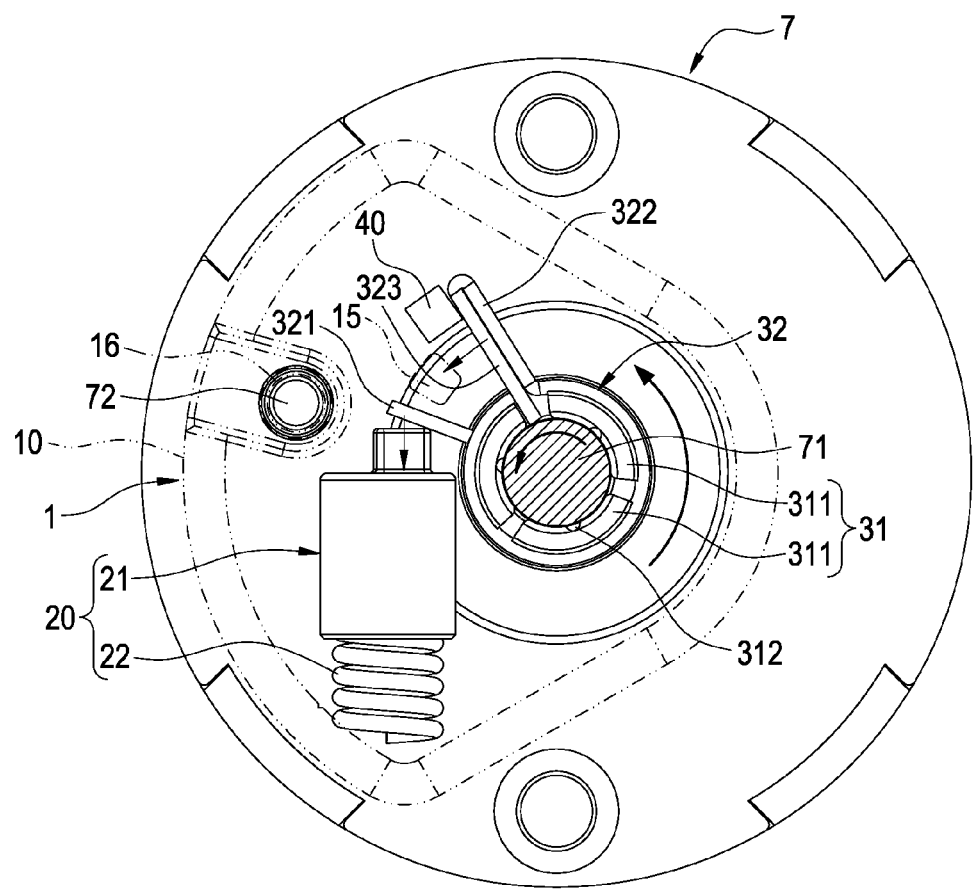
FIG. 7 is a schematic view of a second using status of the braking device used for a motor of an actuator of the disclosure.

As shown in FIGS. 6 and 7, when being used, the rotational direction of the shaft 71 is identical to the rotational direction of the coil spring 32, wherein "identical" indicates that when the coil spring 32 is a right-handed coil spring and the shaft 71 rotates counterclockwise, the first torque arm 321 of the coil spring 32 is elastically abutted by the elastic unit 20, so that the coil spring 32 retracts radially and tightens the braking ring 31, and the braking action is generated by the friction between the inner surface of the braking ring 31 and the circumferential surface of the shaft 71. When the coil spring 32 retracts radially, the second torque arm 322 swings with the rotation of the braking ring 31. When the second torque arm 322 rotates to the position of the stopper 40, it has a maximum braking force so that the shaft 71 stops rotating. Thus, when the motor 7 of the actuator is used in a linear actuator (not shown in the figure) and the linear actuator is assembled in an electric bed or an electric chair, the downward movement of the deck or the seat back would become more slowly, so that the user can have more comfortable using experience.

In contrast, when the shaft 71 rotates clockwise, the first torque arm 321 of the coil spring 32 attaches the vertical column 15, so that the coil spring 32 expands radially. At this moment, the braking ring 31 is released, so that the friction to the rotation of the shaft 71 is decreased, and the shaft 71 can easily rotate inside the braking ring 31. Thereby, it can transmit without affecting the performance of transmission of the motor 7 of the actuator.

Figure 8:
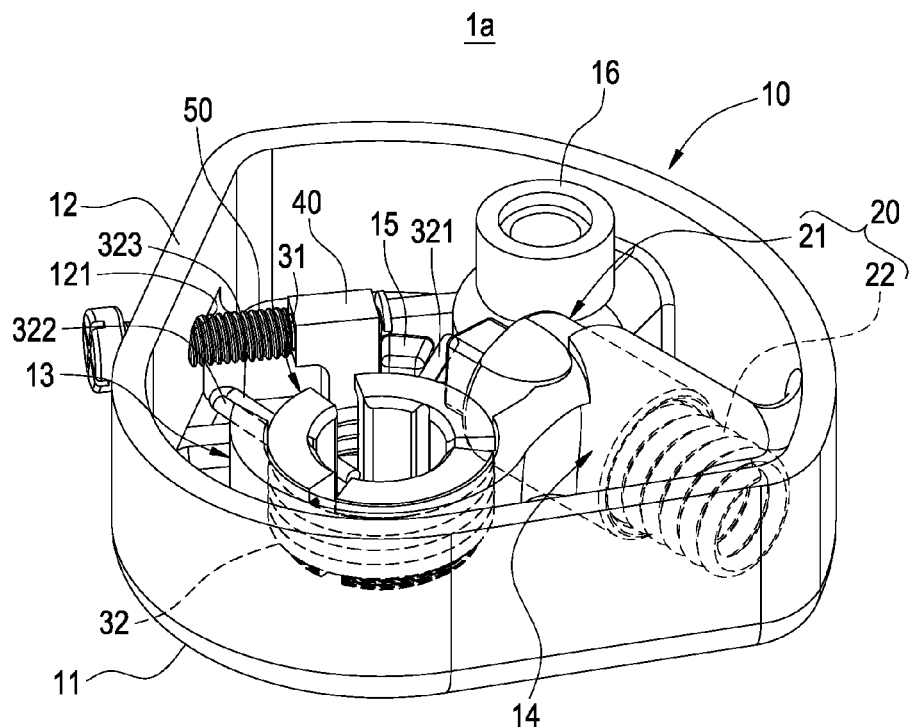
FIG. 8 is a combinational view of the braking device according to another embodiment of the disclosure.

Referring to FIG. 8, the braking device 1a further comprises an adjusting lever 50, the hoarding 12 of the base 10 has a screw hole 121. The adjusting lever 50 screws to the screw hole 121 and then is connected with the stopper 40, so that the stopper 40 can move forwardly or backwardly by screwing-in or screwing-out the adjusting lever 50. Thus, it can be used in motors 7 of the actuator with different braking forces.

Figure 9:
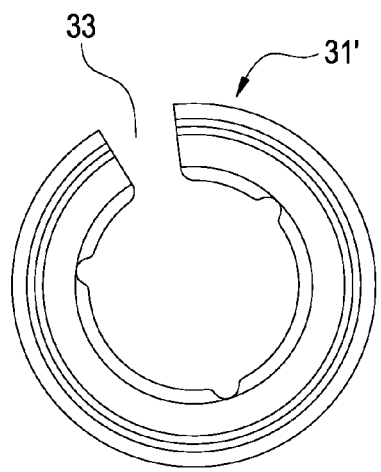
FIG. 9 is an external view of the braking ring of the braking device according to another embodiment of the disclosure.

As shown in FIG. 9, besides the embodiments described above, the braking ring 31' of the disclosure mainly has a sectional groove 33 at a cylindrical barrel, and the sectional groove 33 is parallel to the axis of the braking ring 31'.

According to the above descriptions, the braking device used for a motor of the actuator of the disclosure can achieve the purposes and solve the problems met in conventional technologies. Thus, the disclosure involves novelty and inventiveness as well as meets the requirements of patent application. Thus, the application is applied according to Patent Law. The application is kindly requested to be granted for ensuring the right of the inventors.

What is claimed is:

1. A braking device used for a motor of an actuator, the motor of the actuator comprising a shaft, wherein the braking device comprises:
   a base, including an axial connected section and a placed section formed at a lateral side of the axial connected section;
   an elastic unit, disposed at the placed section;
   a braking mechanism, assembled at the axial connected section, the braking mechanism comprises a braking ring sleeved on the shaft and a coil spring tightened to an outer peripheral edge of the braking ring, a first torque arm and a second torque arm extend from two ends of the coil spring, and the first torque arm abuts one end of the elastic unit; and
   a stopper, corresponding to a rotational path of the second torque arm and is disposed at the base.

2. The braking device used for a motor of an actuator according to claim 1, wherein when a rotational direction of the shaft is identical to the rotational direction of the coil spring, the coil spring tightens the braking ring so as to brake the shaft, and wherein a maximum braking force is achieved when the second torque arm is rotated to a position of the stopper.

3. The braking device used for a motor of an actuator according to claim 2, wherein the base comprises a bottom plate, and the axial connected section is a hole set up at the bottom plate and a curve wall extending from a peripheral edge of the hole.

4. The braking device used for a motor of an actuator according to claim 3, wherein the base further comprises a hoarding extending upward from a peripheral edge of the bottom plate, and the placed section is a semi-cylindrical barrel formed between the bottom plate and the hoarding.

5. The braking device used for a motor of an actuator according to claim 4, wherein the elastic unit comprises a gliding unit and a compressive spring, the gliding unit comprises a cylinder and a protrusion extending from the cylinder, the cylinder is movably disposed inside the semi-cylindrical barrel, and the compressive spring is disposed inside the semi-cylindrical barrel and is elastically clamped between the hoarding and the cylinder.

6. The braking device used for a motor of an actuator according to claim 4, wherein a vertical column extends from the bottom plate and is disposed at a front end of the semi-cylindrical barrel and corresponds to the curve wall.

7. The braking device used for a motor of an actuator according to claim 6, wherein a fixed column is disposed at one side of the semi-cylindrical barrel and the vertical column.

8. The braking device used for a motor of an actuator according to claim 2, wherein the elastic unit is a compressive elastic unit.

9. The braking device used for a motor of an actuator according to claim 2, wherein the braking ring comprises a plurality of curve plates, an inner wall of each of the plurality of curve plates has an oil storage tank disposing therein, and the oil storage tank corresponds to an axial direction of the plurality of curve plates.

10. The braking device used for a motor of an actuator according to claim 9, wherein each of an outer wall of the plurality of curve plates has a plurality of grooves, and each of the plurality of grooves is disposed corresponding to a radial direction of the plurality of curve plates.

11. The braking device used for a motor of an actuator according to claim 9, wherein a stop lever folds inwardly from a free end of the second torque arm, and the stop lever passes into the intervals between any two adjacent curve plates.

12. The braking device used for a motor of an actuator according to claim 2, wherein an angle is formed between the first torque arm and the second torque arm, and the angle is between 10° and 50°.

13. The braking device used for a motor of an actuator according to claim 12, wherein the angle is between 20° and 40°.

14. The braking device used for a motor of an actuator according to claim 13, wherein the angle is 30°.

15. The braking device used for a motor of an actuator according to claim 2, wherein the braking ring is a cylindrical barrel having a sectional groove, and the sectional groove is parallel to an axis of the cylindrical barrel.

16. The braking device used for a motor of an actuator according to claim 2, further comprising an adjusting lever, the base having a screw hole, and the adjusting lever screwing to the screw hole and connecting with the stopper.

17. The braking device used for a motor of an actuator according to claim 2, wherein the stopper is a fixed stopper.

* * * * *